US009527177B2

(12) United States Patent
Grob (10) Patent No.: US 9,527,177 B2
(45) Date of Patent: Dec. 27, 2016

(54) MACHINE TOOL WITH A TOOL CHANGING DEVICE

(75) Inventor: Burkhart Grob, Bad Wörishofen (DE)

(73) Assignee: GROB-WERKE GMBH & CO. KG, Mindelheim (DE)

( * ) Notice: Subject to any disclaimer, the term of this patent is extended or adjusted under 35 U.S.C. 154(b) by 1339 days.

(21) Appl. No.: 12/801,824

(22) Filed: Jun. 28, 2010

(65) Prior Publication Data

US 2011/0015049 A1 Jan. 20, 2011

(30) Foreign Application Priority Data

Jun. 29, 2009 (DE) .......................... 10 2009 031 202

(51) Int. Cl.
*B23Q 3/155* (2006.01)
*B23Q 3/157* (2006.01)
*B23Q 11/08* (2006.01)

(52) U.S. Cl.
CPC ......... *B23Q 3/1554* (2013.01); *B23Q 3/15713* (2013.01); *B23Q 11/08* (2013.01); *B23Q 11/0883* (2013.01); *B23Q 3/15526* (2013.01); *B23Q 3/15766* (2013.01); *B23Q 11/0891* (2013.01); *Y10S 483/902* (2013.01); *Y10S 901/23* (2013.01); *Y10S 901/28* (2013.01); *Y10S 901/41* (2013.01); *Y10T 483/115* (2015.01); *Y10T 483/175* (2015.01); *Y10T 483/1748* (2015.01); *Y10T 483/1767* (2015.01); *Y10T 483/1779* (2015.01); *Y10T 483/1786* (2015.01);
(Continued)

(58) Field of Classification Search
CPC ....... B23Q 3/155; B23Q 3/1554; B23Q 3/157; B23Q 11/08; Y10T 483/115; Y10T 483/1743; Y10T 483/175; Y10T 483/1752; Y10T 483/1755; Y10T 483/1757; Y10T 483/176; Y10T 483/1767; Y10T 483/1771; Y10T 483/1776; Y10T 483/1779; Y10T 483/1783; Y10T 483/1786; Y10T 483/1845
USPC .......... 483/3, 34, 37, 38, 39, 40, 41, 44, 46, 48,483/49, 51, 52, 63, 901; 74/479.01; 901/23, 24
See application file for complete search history.

(56) References Cited

U.S. PATENT DOCUMENTS 3,650,018 A * 3/1972 Perry et al. ..................... 408/35
3,820,234 A * 6/1974 Poincenot ...................... 483/46
4,700,452 A 10/1987 Babel
(Continued)

FOREIGN PATENT DOCUMENTS

DE 195 10 498 9/1996
DE 10 2006 052 402 4/2008
(Continued)

OTHER PUBLICATIONS

EPO Machine Translation of DE 19510498 A1—Hansch et al., "Tool Interchange Arrangement for Machine Tools, Especially Milling Machines," Sep. 26, 1996.*
(Continued)

*Primary Examiner* — Erica E Cadugan
*Assistant Examiner* — Michael Vitale
(74) *Attorney, Agent, or Firm* — Jacobson Holman, PLLC (57) ABSTRACT

The invention refers to a machine tool where in a machine frame a tool spindle is provided. In the machine tool a tool change device for at least one machining tool is arranged. The tool spindle consists of a lug with at least two members wherein the lug holds the tool carrier receiving the machin-
(Continued)

ing tool. The two members are connected flexibly to each other by a bent joint.

15 Claims, 7 Drawing Sheets

(52) U.S. Cl.
CPC .... *Y10T 483/1836* (2015.01); *Y10T 483/1845* (2015.01); *Y10T 483/1882* (2015.01)

(56) References Cited

U.S. PATENT DOCUMENTS

| | | | |
|---|---|---|---|
| 4,945,628 A | | 8/1990 | Novak |
| 4,970,448 A | * | 11/1990 | Torii et al. ................. 318/568.1 |
| 5,133,128 A | * | 7/1992 | Katayama et al. ............. 483/44 |
| 5,649,887 A | * | 7/1997 | Taki et al. ......................... 483/3 |
| 5,811,951 A | * | 9/1998 | Young ....................... 318/568.2 |
| 6,203,479 B1 | * | 3/2001 | Gengo et al. ................... 483/62 |
| 7,182,720 B2 | * | 2/2007 | Shiraishi ............... B23B 39/161 29/DIG. 59 |
| 7,316,639 B2 | * | 1/2008 | Schmauder .................... 483/61 |
| 2005/0239620 A1 | * | 10/2005 | Lutz et al. ...................... 483/63 |
| 2007/0078043 A1 | * | 4/2007 | Yoshida ............................ 483/3 |
| 2007/0087924 A1 | * | 4/2007 | Krosta et al. ..................... 483/1 |

FOREIGN PATENT DOCUMENTS

| | | | | |
|---|---|---|---|---|
| EP | 640433 A1 | * | 3/1995 | ............. B23Q 3/157 |
| EP | 1 004 393 | | 5/2000 | |
| JP | 09309044 A | * | 12/1997 | ............. B23Q 11/08 |

OTHER PUBLICATIONS

JPO Machine Translation of JP 09309044 A—Sugisaka et al. "Door Device for Machine Tool," Dec. 2, 1997.*
Extended European Search Report mailed Oct. 1, 2010 from European Patent Office issued in corresponding European application No. EP 10 00 6578 (English translation provided).
Chinese office action issued on Dec. 4, 2013, to a corresponding Chinese Patent Application 201010220724.9.

* cited by examiner

MACHINE TOOL WITH A TOOL CHANGING DEVICE

The invention refers to a machine tool comprising a tool spindle, and at least one machining tool can be changed or exchanged in the tool spindle by a toll change device provided in the machine tool, and the tool spindle sets the machining tool for machining purposes in rotation around a spindle axis.

BACKGROUND OF THE INVENTION

Machine tools mentioned above are sufficiently known, for example for metal-cutting material machining. They are used, for example, as machining units or as machining centers, in particular in the field of metal working. A characteristic of machine tools of this kind is that the tool change process has to be carried out as fast as possible in order to minimize standstill times of the machine tool. In order to guarantee, on the one hand, a high variability in machining with machine tools of this kind, and, on the other hand, to accelerate the tool change process accordingly, it is known to provide in the machine tool tool magazines in which a number of storing places for receiving the single machining tools. Known tool change devices combine a linear movement of the one-membered lug with a rotational movement of the tool carrier held by the lug which usually has two tool receivers. This kinematic arrangement, however, is inflexible and makes it impossible or possible only with great effort that multiple-piece tool magazines, which may be arranged at different points within the machine tool, interact efficiently with the tool spindle.

Therefore it is an object of the invention to suggest an arrangement which increases the mobility of the tool change device arranged in the machine frame in order to offer the opportunity of changing and exchanging fast and efficiently machining tools at the spindle from a rather large supply of machining tools stored in the machine tool.

SHORT SUMMARY OF THE INVENTION

In order to solve this problem the invention refers to a machine tool as described in the beginning and suggests that the tool change device has a lug consisting of at least two members, and the lug holds the tool carrier receiving the machining tool, and at least two members are connected flexibly by a bent joint with a bent axis.

The problem described in the beginning is solved perfectly by the suggestion according to the invention. The design of the lug with at least two members connected flexibly to each other by a bent joint makes it possible to increase the mobility and therefore the spatial positioning of the tool carrier holding the machining tools considerably. It is also possible by the suggestion according to the invention, depending on the design and the length of the members, respectively, to reach even tool magazines rather distanced from the actual working space with the tool change device. Therefore it is possible to arrange a rather large supply of tools even distanced farther away within the machine tool, or even cleverly to provide a separation of the supply of tools into several tool magazine parts, wherein a first tool magazine part is arranged in a shorter distance to the tool spindle, and a, for example, designed larger second tool magazine part is further distanced. Thus, it is possible to provide tools which are needed frequently in the tool magazine part closer to the tool spindle, tools needed more rarely may be stored farther away, in the second tool magazine part which can be reached, however, by the tool change device.

In the machine tool according to the invention therefore drives are provided at the tool change device serving for moving the member or the members and also the tool carrier. The drives or at least one of the drives is here conveniently designed as rotational drive. A rotational drive of this kind, which drives, for example, step by step or continuously, makes a complete rotation of the members or the tool carrier around the corresponding joints or axes connecting the members possible, increasing thus the flexibility and the range of the lug and thus the possibility for a spatial positioning of the tool carrier holding the machining tools. The rotational drive is here in particular position-controlled or designed as NC-controlled rotational drive. This means that in the machine tool according to the invention a separate or integrated in the machine control or coupled with it numeric control is provided which is able to read a data record of control commands which are defined, for example, depending on the procedure of the work piece machining, to transfer it in operation and movement procedures, and to work it one after the other. The movement of the lug or the tool change device can be adjusted perfectly by the mentioned embodiment of the rotational drive on the side of the control to the machining processes in the machine tool, so that further improvements of the cycle times, in particular by optimizing the tool change processes, can be realized.

A preferred embodiment of the machine tool according to the invention contributes also to an improvement of the positioning of the machining tools or of the tool carrier receiving this machining tools, wherein in particular the angle position of the members to one another with respect to the bent axis as well as the angle position of the first member relatively to the basic body can be adjusted or set via the above-mentioned (rotational) drives, and the tool carrier or the tool receiver can rotate vertically to the spindle axis around the carrier axis. A design of this type of the machine tool according to the invention makes adjusting and positioning anew of the machining tools or the tool carrier, depending, for example, on a movement of the spindle or the machining tool, possible. This makes a collision-free and particularly fast positioning of the tool change device or tool carrier possible which is adapted to the movement of the machining tool and thus contributes also to the improvement of cycle times during machining of work pieces in the machine tool according to the invention.

An embodiment of the machine tool according to the invention seen as favorable is characterized in that a machining space and a tool change space for the tool change device separated spatially from it is provided. A spatial separation of machining space and tool change space is reached in particular by the arrangement of a dividing wall. The tool spindle or the machining tool can be moved, in particular shifted, for the tool change out of the machining space in the tool change space. This design of the machine tool makes it possible to realize a particularly compact construction of the machining space as all machine parts required for the tool change remain outside the machining space. As the machining space only has to receive eventually only the machining tool as well as the work piece to be machined it can be dimensioned rather small. This has advantages, in particular for cleaning or removing the chips occurring during machining as here a comparatively good cleaning performance is possible with a rather small use of cleaning agents. The machining tool is removed for the tool change completely from the machining space, a tool change is carried out spatially separated from the machining space, and the machining tool is, after that, again introduced in the machining space, for example, slid in. The design has the further advantage that only little or no dirt at all is transferred from the machining space in the tool change space, so that heavy soiling and a possible premature wear of the tool change device can be prevented.

The machine tool according to the present invention has preferably a tool spindle which can shift, for example for machining purposes, parallel to the dividing wall, in particular at least along a (preferably horizontal) space axis. For that, an additional degree of freedom of movement of the tool spindle is realized despite the existing dividing wall. This is done in that in the dividing wall in particular an opening is provided, within which the tool spindle is shifted parallel to the dividing wall. In order to realize nevertheless a sealing of the machining space towards the tool change space, it is provided that in this opening flexible elements are arranged which may allow a movement of the tool spindle or the machining tool extending through the dividing wall, however, seal the machining space nevertheless sufficiently towards the tool change space. Flexible elements of this kind may be designed, for example, in the form of a window shade or the like.

For labor and apparatus protection reasons, in order to reach sound absorption or in order to cover the tool spindle or the other elements of the machine tool carrying the machining tools even in the machining position or during the machining process, the machine tool according to the invention has preferably a cover. This cover is designed as a hood encircling the tool spindle in the tool change space at least in sections, however, releasing the tool spindle for the tool change. It has been proven as favorable if the cover is designed shifting relatively to the spindle axis, that means that the cover can be drawn back, shifted to the front or bent or swiveled away parallel to the spindle axis for the tool change in order to release the machining tool. Here, for the tool change procedure the tool spindle is drawn back in the direction of the spindle axis, so that the machining tool gets from the machining space in the tool change space. In the same way there is the possibility that the cover is designed in such a way that it can shift together with or before the spindle or independent from it (with a separate drive) along the spindle axis, and, when the tool spindle is drawn back for the tool change, at the same time or before this movement glides back or swivels back in order to release the tool spindle or the machining tool for the tool change. In order to make a sealing of the dividing wall possible, furthermore a stopper or a receiver is provided at the dividing wall with which the cover is in close engagement. The cover does not only prevent dirt from getting in or sound from being emitted, but it protects the tool spindle, for example also from error-caused collisions, for example with the tool or the tool carrier.

The machine tool according to the invention also solves the problem of reducing the machining times of work pieces by reaching a fast tool change. Very short times from metal cutting to metal cutting of, for example, 3 sec. to 5 sec. depending on the machine, are planned here. In order to reach this goal it has proven advantageously if the tool carriers equipped with tools are arranged in the immediate neighborhood of the machining tool or tool spindle. Furthermore, it is provided that the tool change device or the tool carrier remains in the tool change space during machining, and can be positioned here in particular near the machining tool moved in the tool change space. Because of the movement and the already mentioned above free positioning of the machining tool, the tool spindle or the tool change device here in particular a constant distance between machining tool and tool carrier can be realized, as, among others, because of the NC control of the corresponding drives of the tool change device it is also possible to keep the constant distance even with position changes of the tool spindle. The distance which has to kept at least between tool change device or tool carrier and machining tool or tool spindle results from the reaction time for a movement of the tool change device or the tool carrier and the linear speed of the tool spindle (parallel to the dividing wall) during shifting or moving in the machining space. If the distance is less than the way covered by the moving machining tool or the tool spindle until a reaction, that means a movement of the tool change device or the tool carrier occurs, a collision of the two machine elements cannot be prevented. Therefore it is favorable, if these two movement components are adapted accordingly to one another, and the distance between the elements is set, kept and there be kept as low as possible with regard to that, in order to be able to provide the tool change device or the tool carrier quickly for a tool change. By means of that then the time for changing the tool can be reduced significantly, and thus the cycle times for machining can be reduced. This also results in a definition of the neighboring position of the tool change device to the tool spindle or machining tool.

Also by tracking of the tool change device according to the movement of the tool spindle it can be reached that the time for guiding back the tool spindle to a starting point for the machining is used actively for the tool change, if end and starting point of the machining differ. By tracking the tool change device or the tool carrier the tool change procedure can be carried out directly at the end of the machining step during drawing back of the spindle out of the machining space, and can continue during the shifting of the tool spindle in the tool change space. Through the flexibility reached with the machine tool according to the invention in positioning the tool change device as well as the tool spindle also the shifting times can be used perfectly in respect of reducing the cycle times.

In this connection it is seen as favorable if the tool spindle is designed in particular horizontally moving relatively to the spindle axis. The movement of the tool change device and/or the tool carrier can then be adjusted or set by the movement of the tool spindle so that the above-mentioned advantageous effect of the machine tool can be realized and always a perfect positioning of the machining tools is guaranteed.

The suggestion according to the invention does not necessarily require here that the machine tool according to the invention has to be equipped with a multi-piece tool magazine. Even with a usual supply of machining tools in the machine tool the suggestion according to the invention has already advantages, as by bending the two members a very space-saving design of the tool change device is possible. A space-saving arrangement of this type has not been possible with lugs equipped with linear actuators according to the state of the art.

However, just the space within the range of a machine tool defined by the machine frame is valuable and eventually defines the size of the tool change space or the machining space and thus also the maximal size of a work piece which can be machined with the machine tool according to the invention, or the constructive size of the machine tool according to the invention.

It is another advantage of the invention here that the tool change device, because of its construction according to the invention, can also be swiveled out of the machining range, the working room, and does not interfere as, by the design of the lug with at least two, if necessary even more, members and its flexible arrangement, the lug can be swiveled out of the way folded or angled in a space-saving manner.

Advantageously a machine tool according to the invention is suggested in which a tool spindle is provided. The machine tool has a stiffening machine frame carrying the different elements of the machine tool, the machine frame being also called "engine frame", if possible. In an interpretation of the term "machine frame" here the machine frame is defined by the outside machine edges defining the machine tool, and the tool spindle is within this volume defined by these edges. According to the design of the machine frame also the machine covering, which may, if necessary also project beyond the carrying elements of the machine frame or may have integral qualities, are part of it.

It is clear that the tool spindle arranged in the machine tool, that is within the machine frame defined by the exterior edges, can be angled towards the work piece, and therefore is movable around at least one, usually several axes (two or three axes) arranged preferably orthogonal.

In a preferred embodiment of the invention it is provided that the tool change device is arranged in the machine frame.

As already described, the term "machine frame" defines the exterior dimensions belonging to the machine tool. With reference to these dimensions in this modification according to the invention the tool change device is located inside. It is an aspect of the invention here that the tool change device is actually a part of the machine tool and is realized in it, so that also a very compact machine tool can be realized as no outside arranged tool change devices have to be provided. At the same time, the arrangement is, according to the invention, realized very space-saving so that a rather small working room can be realized for the machining of the work pieces as here only the work piece and the machining tool have to be accommodated, however, the tool change device remains below the machining or working space.

Besides the modification where the tool change device is arranged in the machine frame, the invention also comprises solutions where the tool change device is arranged besides the machine frame, if necessary on a separate frame or support, if necessary besides the machine frame, suspended or supported.

In another preferred embodiment of the invention it is provided that the tool change device is held by the machine frame. A design of this type has the effect that the tool change device, which has a considerable weight, is supported on bearings perfectly, and the elements responsible for the stability of the machine tool are here also employed accordingly.

Furthermore it is provided that during the machining operation of the machining tool held by the tool spindle at least the tool carrier remains in the machine tool, and here, in particular in the tool change space, if necessary directly to the tool spindle or the cover encircling it during machining.

By means of this design it is reached that at least the tool carrier remains positioned rather closely to the tool spindle, and thus, after finishing the machining, already after a short period of time the machining tool which is not needed anymore can be exchanged.

Furthermore the invention provides that the tool change device has a basic body on which the lug is arranged flexibly, in particular rotating, on a basic joint with a basic axis. As basic body, for example, an area of the machine frame or engine frame can be employed. However, as basic body here also a separate element is provided alternatively which can be fastened or supported in a suitable way at the machine tool or the machine frame. The tool change device can be fastened or supported in the machine tool by the basic body. The lug consisting of several members is connected to this basic body. For that purpose there is a basic joint with a basic axis. Thus, it is possible to swivel the entire lug (folded out or together) around the basic axis, a swiveling area of up to 360° being in particular provided for this. By an opposed swiveling movement of the single members towards the bent joint on the one hand, or the basic joint on the other hand, it is, however, also possible to realize eventually a linear movement for the work piece carrier. Only one member, which is connected to the basic body, is swiveled, otherwise, however, the complete lug remains on the same side of the basic body.

Cleverly, suitable drives are provided on the tool change device serving for moving the member or members and also the tool carrier, in particular for the swiveling movement on the respective joints.

For an even higher flexibility of the tool change device it is provided that it or its basic body can be moved and positioned along a guide at least in one space direction. The basic body then has the design and task of a slide which can be positioned moving on a guide lane or guide rail, and can be moved at suitable positions within the machine tool or at the machine tool, for example for loading and unloading processes with reference to tool locks, tool magazine or tool spindle. For the movement of the slide on the guide a drive is provided.

The arrangement is not restricted to a positioning along an axis, it is also possible, for example, to realize a compound rest guide, and thus to realize mobility of the tool change device or its basic body along two axes.

It is, of course, also possible that the basic body is designed stationary in the machine tool, and the mobility of the single elements, the members of the lug to each other and with respect to the basic body as well as also the mobility of the tool carrier are sufficient to reach all areas within the machine tool.

It has proven to be convenient to equip the tool carrier preferably with two tool receivers which can swivel together around a rotational axis. The design is here such that in a first tool receiver an empty space is provided in order to receive the machining tool to be exchanged from the tool spindle, and to supply in a second tool receiver the machining tool which has to be changed.

Another advantageous embodiment of the invention is the arrangement of basic axis, bent axis, rotational axis and spindle axis in pairs parallel to each other. Of course, the invention also comprises solutions where any three of the above-mentioned four axes are arranged parallel to one another. In particular favorable is the embodiment where basic axis, bent axis, rotational axis and spindle axis each are parallel to one another as the result here are rather simple kinematics.

With reference to the tool magazine it has already been pointed out that it is an advantage of the invention that the tool magazine is not only designed in one piece, but consists, if necessary, of at least two tool magazine parts arranged one beside or even behind the other. The tool magazine or the tool magazine part is designed, for example, as disc or chain magazine. Here the single machining tools are in storing places provided in the marginal area of the tool magazine or the tool magazine part. In order to be able to supply a rather large number of machining tools, the tool magazine or tool magazine part is designed with a rather large surface, wherein preferably the tool axis of the supplied machining tools (and thus also the spindle axis) is parallel to the normal line of the plane of the planar design of the tool magazine or the tool magazine part. According to the invention it is now possible to supply an even larger number of machining tools in the tool machine according to the invention, if the tool magazine is divided into several tool magazine parts which, for example, are placed one beside the other, as it is shown, for example in FIG. 1, or are arranged one behind the other, as for example in FIG. 2. If the arrangement is one beside the other, seen in the direction of the normal line of the plane, both tool magazine parts are visible, if the arrangement is one behind the other, the front part covers the tool magazine part which is behind.

Of course, it is also possible to realize suitable mixed types, that is, for example, to provide four tool magazine parts altogether which are divided in two groups arranged one beside the other which each has two tool magazine parts one behind the other. If the design of the tool magazine parts and the arrangement of the tool magazine parts is clever a very large amount of machining tools can be supplied in the machine tool.

Just with rather complexly constructed tool magazines or tool magazine parts it is an advantage that the basic body can move and be positioned parallel and/or rectangular to the spindle axis in order to reach thus also farther removed areas of the tool magazine or tool magazine part. It is provided here that the basic body can move and be positioned in particular along a connecting axis of the tool magazine parts to shorten by means of that the access to the magazine parts or the time of access and thus to optimize further the cycle times in order to guarantee thus a selection and change process of the tools without any problems.

Preferably a movement of the tool carrier as linear as possible just for putting in or removing a machining tool in the storing space of a tool magazine is striven for. According to the construction of the tool change device with several members which form a lug and can be angled or bent to each other (and therefore swiveling to each other), of course the swiveling movement of the single elements is predominant. Therefore in the drive control of the drives an axis transformation is provided in such a way that the movement the single members to each other, which is effected by the drives, is superimposed so cleverly that the result is the desired movement. The axis transformation translates here the desired movement of the tool carrier in single swiveling movements of the single members which superimpose then one another cleverly that the desired movement results. Therefore it is possible, to realize, for example, a linear movement (for example in the frame of a linear transformation) as well as also a bent line of movement. By means of the axis transformation the number of the different degrees of freedom of the single members is used cleverly in one, if necessary also complex, movement of the tool carrier. Eventually, by means of the axis transformation the Cartesian movement coordinates are transformed to the movement coordinates of the respective reference systems of the single members or also vice versa.

In a preferred embodiment of the invention it is provided that the tool magazine and the tool change device are arranged on a common carrier. Therefore it is possible to pre-fabricate this combined constructive unit separately, and to put it module-like in the machine tool. It is in particular possible, to chose a modular construction in order to put thus, for example, a large number of pre-fabricated carriers in different tool magazines. By the considerable interaction of the tool change device with the tool magazine also the common arrangement on one carrier is an advantage because of the construction.

Usually the drive control of the drives of the tool change device is part of the control of the tool change device. According to the invention it is suggested that the machine drive comprises the control of the tool change device integrated, and thus also, with respect to the data, a high availability and a quick exchange of the tools is possible.

BRIEF DESCRIPTION OF THE DIFFERENT VIEWS OF THE DRAWINGS

In the drawing the invention is shown schematically in an example. In the drawings.

DETAILED DESCRIPTION OF THE PREFERRED EMBODIMENT

In the Figs. identical or corresponding elements each are indicated with the same reference numbers, and are therefore, if not useful, not described again.

Figure 1:
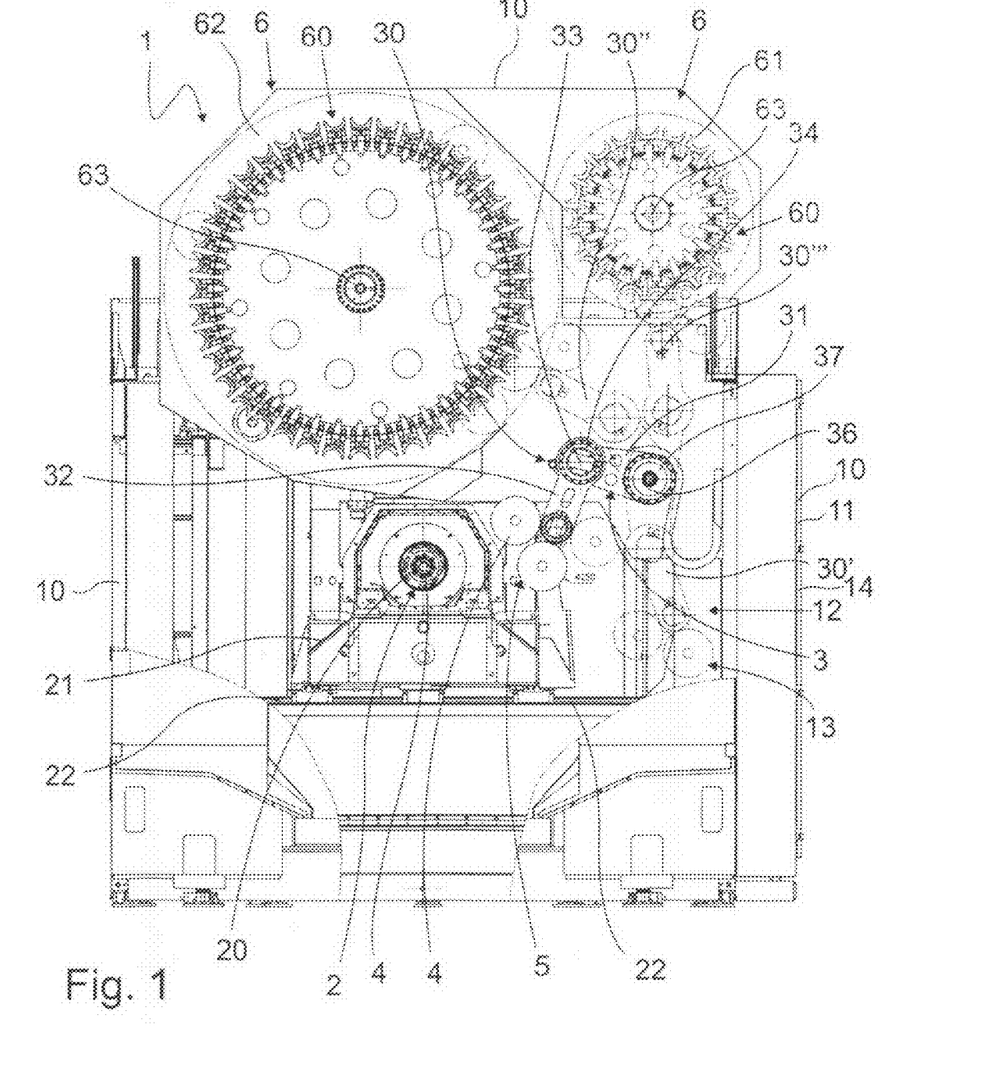
FIG. 1 in a view the tool machine according to the invention.

In FIG. 1 the machine tool 1 according to the invention is shown schematically. The different elements of the machine tool 1 are supported by a machine frame 10 which also comprises, as shown here, the machine housing. The machine frame here encloses the space within which the different elements of the machine tool are arranged. These are, among others, the tool spindle 2, the tool change device 3 as well as the tool magazine 6, which consists, in the example shown here, of two tool magazine parts 61, 62.

The view chosen in FIG. 1 makes a view in the direction of the spindle axis 20 (extending rectangular to the surface of the sheet) from the front in the machine tool 1 possible. On the right beside it and slightly higher arranged than the spindle axis 20 the tool change device 3 is provided.

The tool change device 3 consists of a basic body 35 (covered in FIG. 1) to which lug 30 is flexibly connected with via the basic joint 37. On the side of the lug 30 opposite the basic body 35 there is the tool carrier 5 carrying or supplying the machining tools 4 which have to be put in and exchanged in the tool spindle 2.

According to the invention it is suggested that the lug 30 consists of at least two members 31, 32 connected to each other by a bent joint 34. The design of the bent joint 34 also defines a bent axis 33. It can be seen clearly that in the drawn-out view of the lug 30, between the first member 31 and the second member 32 of the lug, there is a bent angle of slightly more than 90°.

The tool spindle 2 can be moved and positioned, if necessary, along several axes. For the actual machining process the spindle, in particular the machining tool 4, can be angled or moved back in the direction of the spindle axis 20 towards the work piece (not shown).

The entire tool spindle is built on a slide 21 which can move longitudinally and be positioned on a guide 22. The direction of the guide 22 is here rectangular to the spindle axis 20 (and thus also rectangular to the bent axis 33). Such a mobility is sufficiently known in the state of the art. This mobility on the guide 22 makes it possible to shift the tool spindle 2 in the machine tool 1 to the right, and thus to bring the tool spindle 2 in the range of the tool carrier 5. This makes it possible to save constructive size of the lug 30, this has only be dimensioned for reaching the single tool magazine parts 61, 62 or the tool magazine 6.

However, FIG. 1 does not only show one position of the lug 30, but even three other alternative positions of the lug 30', 30", 30'" which are indicated by a smaller line width or dashed. The position of the lug 30' shows the lug almost completely extended in its bent joint swiveled downward to the right. In this area the machine housing 11 has a lock door 14 through which at the level of the user in a simple way a machining tool 4 can be transferred in the interior of the machine tool 1, or, for example a damaged tool can be transferred out. The lock door 14 locks here the tool change lock 12 of the machine tool 1 in which at least one holding place 13 is provided for a machining tool 4.

The lug position 30' describes the position of lug 30 for picking up, for example, a machining tool out of the holding place 13 or to put it in there.

Furthermore, it is possible to position the lug 30, for example, in a waiting position, for example a position corresponding with the lug position 30', wherein the tool carrier 5 may then already may be loaded with an exchange tool 4, however, the lug, however, is altogether too far removed from the machining room, and thus does not interfere with the machining there.

The lug position 30" shows a second position variant of the lug for storing or picking up from a larger tool magazine part 62 which is essentially located above, moved slightly to the left to the tool spindle 2. Here also the lug 30" is almost completely extended, similar to the third lug position 30'" where it is indicated that the tool change device interacts with the other, smaller tool magazine part 61 for loading or unloading of machining tools.

This tool magazine part 61 is also positioned above the basic joint 37, that is above the tool change device 3, on the right beside the clearly larger, as equipped with a larger diameter, second tool magazine part 62.

The basic joint 37 defines a basic axis 36 around which the lug 30 can swivel around the basic body 35.

Figure 2A:
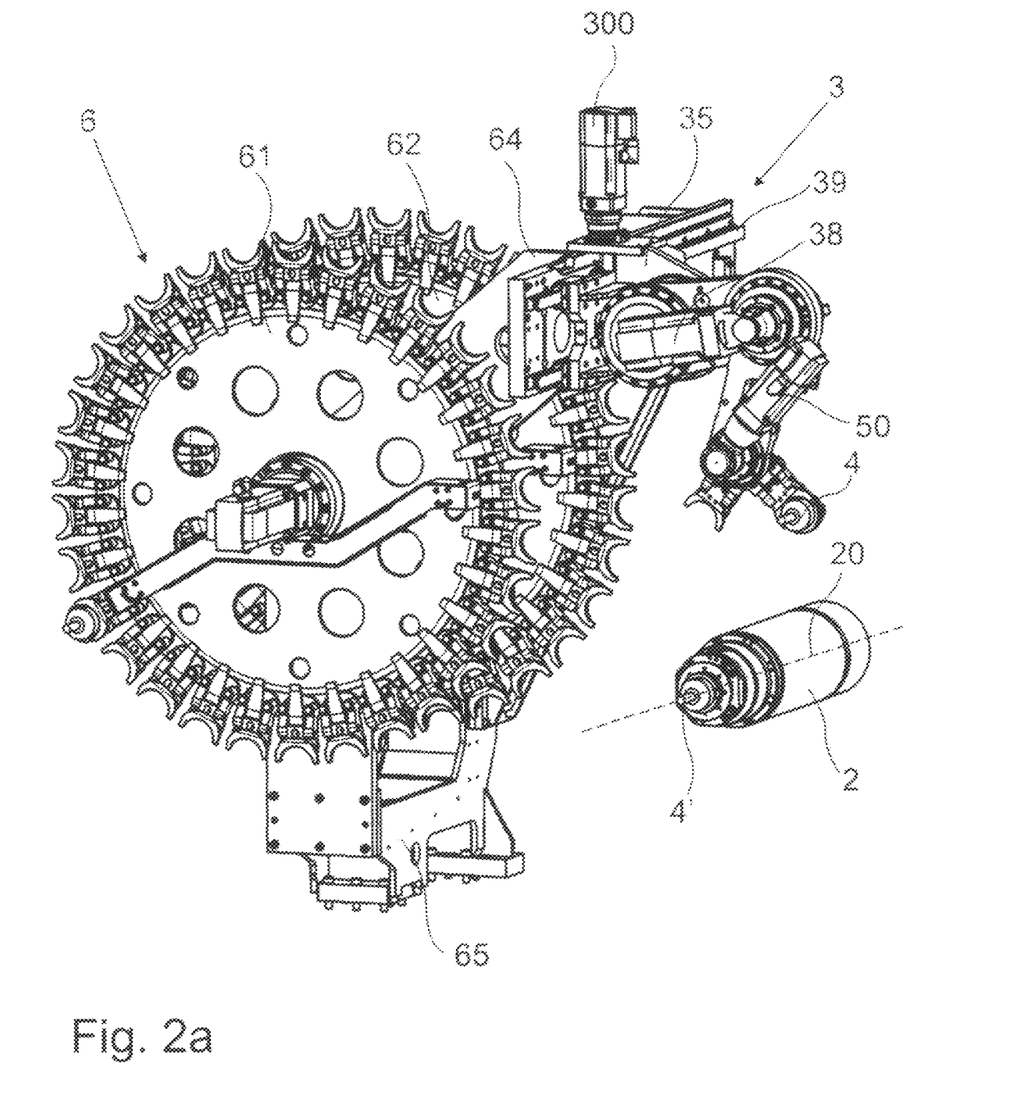
FIGS. 2a, 2b, 3a, 3b in a three-dimensional view (FIGS. 2a, 3a) or in a view (FIGS. 2b, 3b) the essential elements according to the tool machines of the invention in two different positions of the tool change device.
Figure 2B:
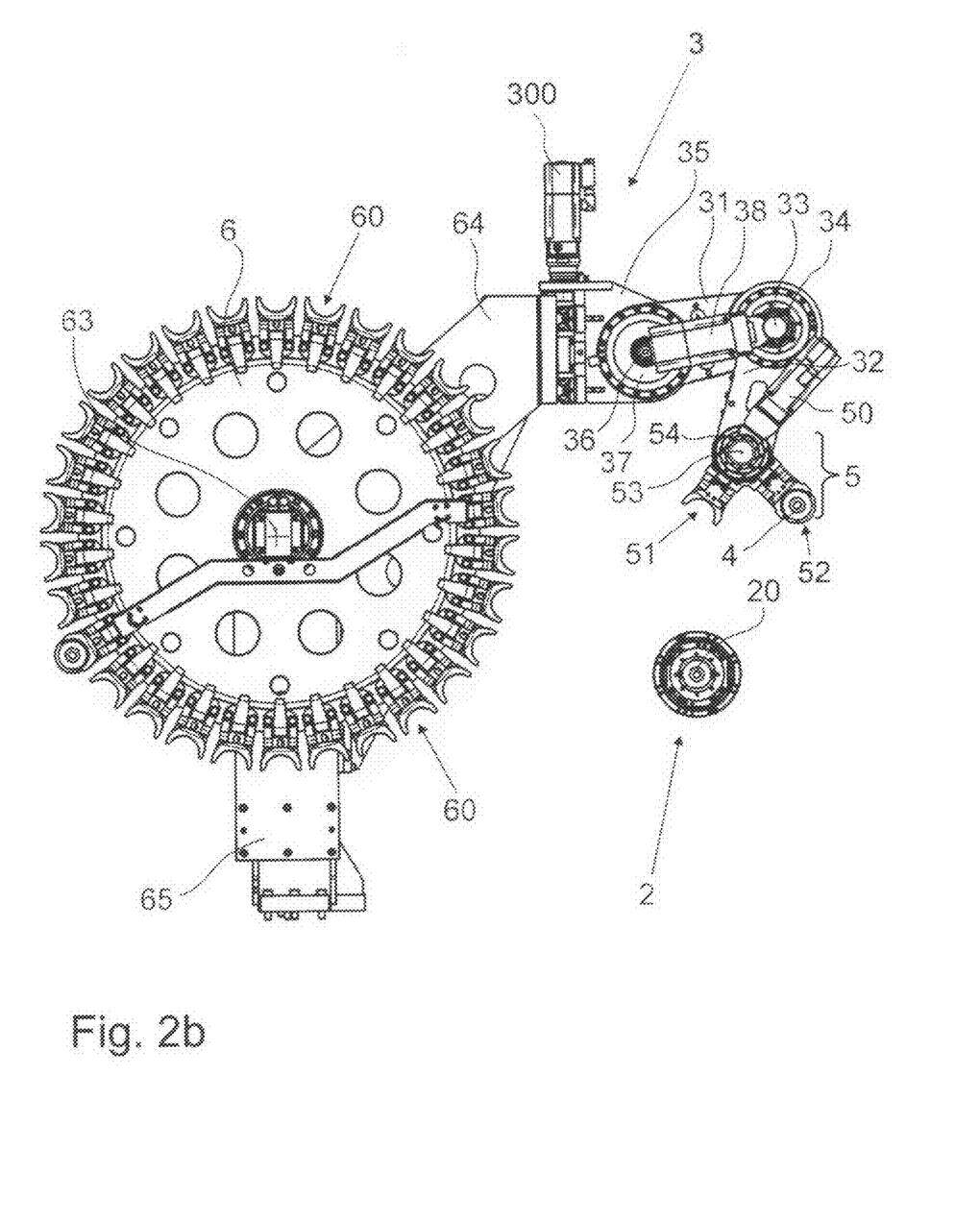

In FIG. 2b a simplified, schematic drawing of the machine tool according to the invention is shown. It has to be considered that the tool magazine 6 is, in the view shown here, arranged beside the tool spindle 2. The tool spindle 2 itself is located essentially below the tool change device 3.

The tool magazine 6 as well as the two tool magazine parts 61, are designed as disc magazine, and can rotate around a center axis 63. The center axis 63 is parallel to the spindle axis 20.

The tool magazine 6 designed as disc magazine according to FIG. 2b has at its circumference a number of storing places 60 for the different machining tools 4. Usually not all storing places 60 are occupied in order to provide place for receiving of machining tools 4 exchanged from the tool spindle 2, or machining tools 4 newly put in the machine tool.

FIG. 2a shows in a three-dimensional view the situation according to FIG. 2b wherein it becomes clear that also the tool magazine 6 consists in the embodiment shown here of two tool magazine parts 61, 62 arranged one behind the other. The respective center axes of the two tool magazine parts 61, 62 also designed as discs coincide. The tool magazine parts 61, 62 also have storing places 60.

The two tool magazine parts are here on a common stanchion receiving the center axis 63 on which a common carrier 64 extends radial, diagonally upwards out of it on the exterior end of which the tool change device 3 is connected.

The entire integral constructive unit of tool magazine 6 and tool change device 3 is connected in a suitable way by the base part 65 in the machine tool 1, for example to its machine frame 10 or engine frame.

In FIG. 2b the different elements of the lug 30 can be illustrated clearly. The tool carrier 5 has two tool receivers 51, 52 wherein in the second tool receiver 52 already a machining tool 4 is supplied for a change procedure at the tool spindle 2.

The other tool receiver 51 is empty and serves for receiving the machining tool 4' to be exchanged clamped in the tool spindle 2 (FIG. 2a). The two tool receivers 51, 52 extend radial with reference to the carrier axis 53. The tool carrier 5 is here connected to the outer end of the lug 30 via the carrier joint 54. The angle position of the two tool receivers 51, 52 to one another with reference to the carrier axis 53 is rigid, a drive 50 serves for a rotational movement of the tool receivers 51, 52 around the carrier axis 53.

The drive 50 effects that during the change or exchange process the machining tool which has to be exchanged is swiveled away, after it has been put in the initially empty tool receiver 51, in order to bring simultaneously the machining tool 4 to be changed into the put-in position relatively to the tool spindle 2.

As already described several times, the lug 30 consists of several members 31, 32. In the example shown here two members 31, 32 are provided. The two members 31, 32 are connected to each other via the bent joint 34, the angle position of the two members 31, 32 to one another with reference to the bent axis 33 can be set or adjusted by the drive 38. The arrangement has been chosen here in such a way that the second member 32 carrying the tool carrier 5, and the first member 51 are connected flexibly via the basic joint 37 with the basic body 35. On the back side, covered in FIGS. 2b and 2a, respectively, there is another drive for changing and adjusting the angle position of the first member 31 relatively to the basic body 35.

The basic body 35 is, in a first modification according to the invention, designed stationary in the machine tool 1, however, in the embodiment shown in particular in FIG. 2a the basic body 35 is realized slide-like and positioned longitudinally moving on a guide 39. The orientation of the guide 39 is here parallel to the center axis 63 or the spindle axis 20 or also the bent axis 33 or basic axis 36. A drive 300 moves and positions the basic body 35 on the guide 39.

Cleverly an electro motor, if necessary with a gearing, is provided as drive 300, 38, 50.

Figure 3A:
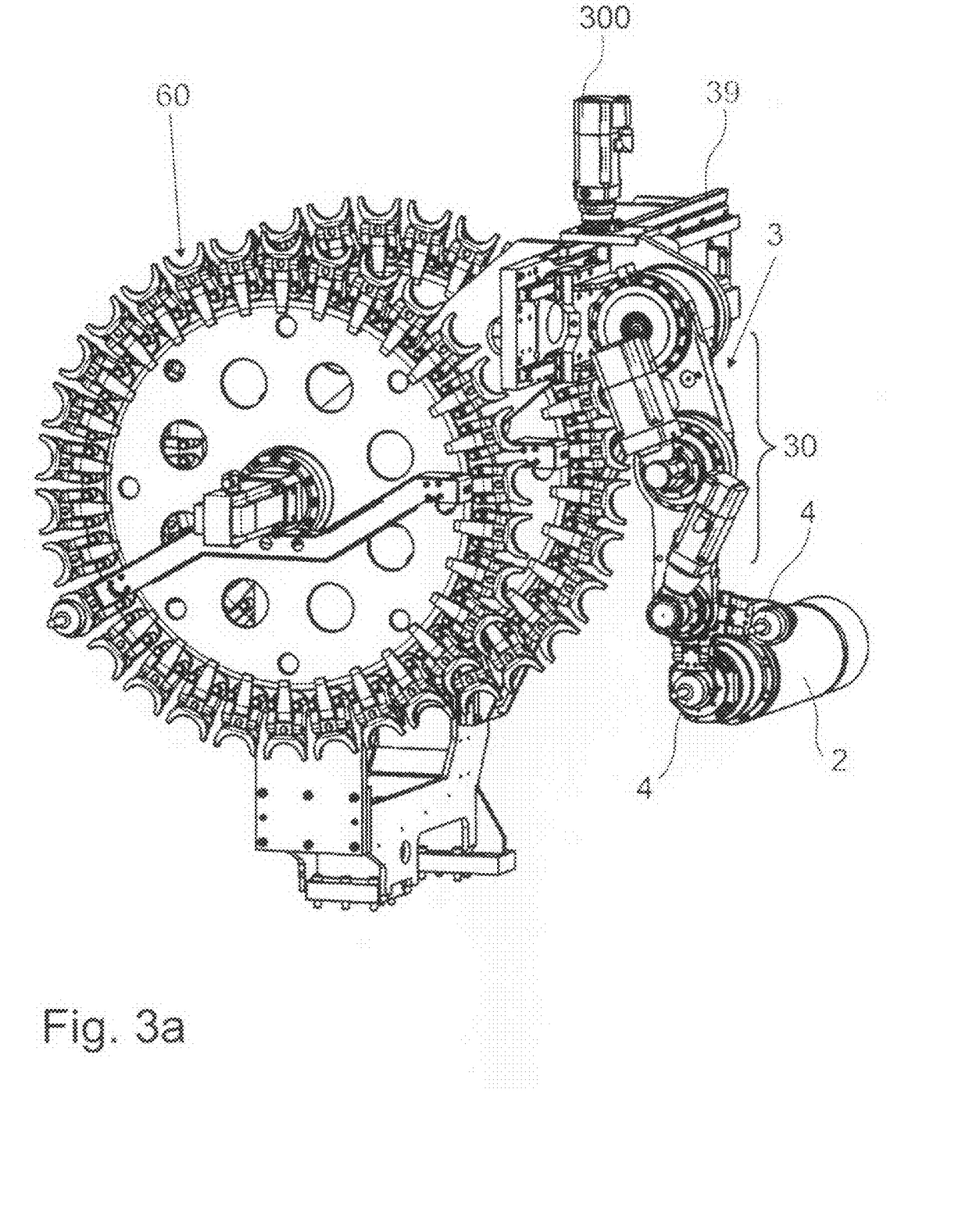
Figure 3B:
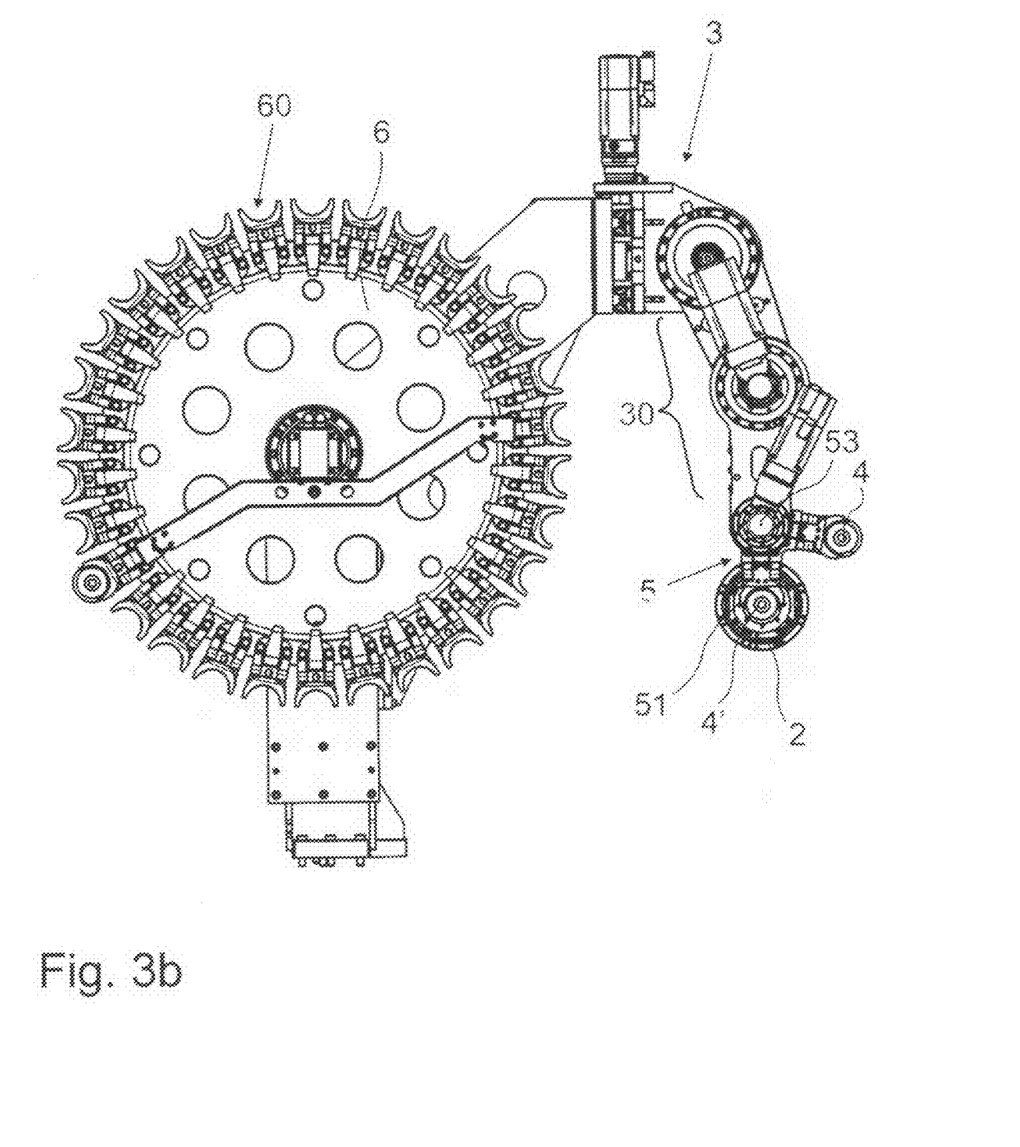

In FIGS. 3a, 3b the tool change process on the spindle 2 is shown at a slightly later time. FIGS. 3a, 3b correspond in this respect with facts mentioned in FIGS. 2a, 2b, repeating is not necessary in this area.

It can be seen clearly that the lug 30 is in the position according to FIGS. 3a, 3b almost completely extended, and the still empty tool receiver 51 of the tool carrier 5 is just receiving the machining tool 4' to be exchanged. After the machining tool 4' has been taken out of the spindle head of the tool spindle 2, a swiveling movement of the tool carrier 5 is carried out clockwise around the carrier axis 53 around about 90° (corresponds with the angle distance of the two tool receivers 51, 52 relatively to the carrier axis 53), in order to put in the machining tool 4 supplied in the second tool receiver 52 in the tool spindle 2.

Figure 4:
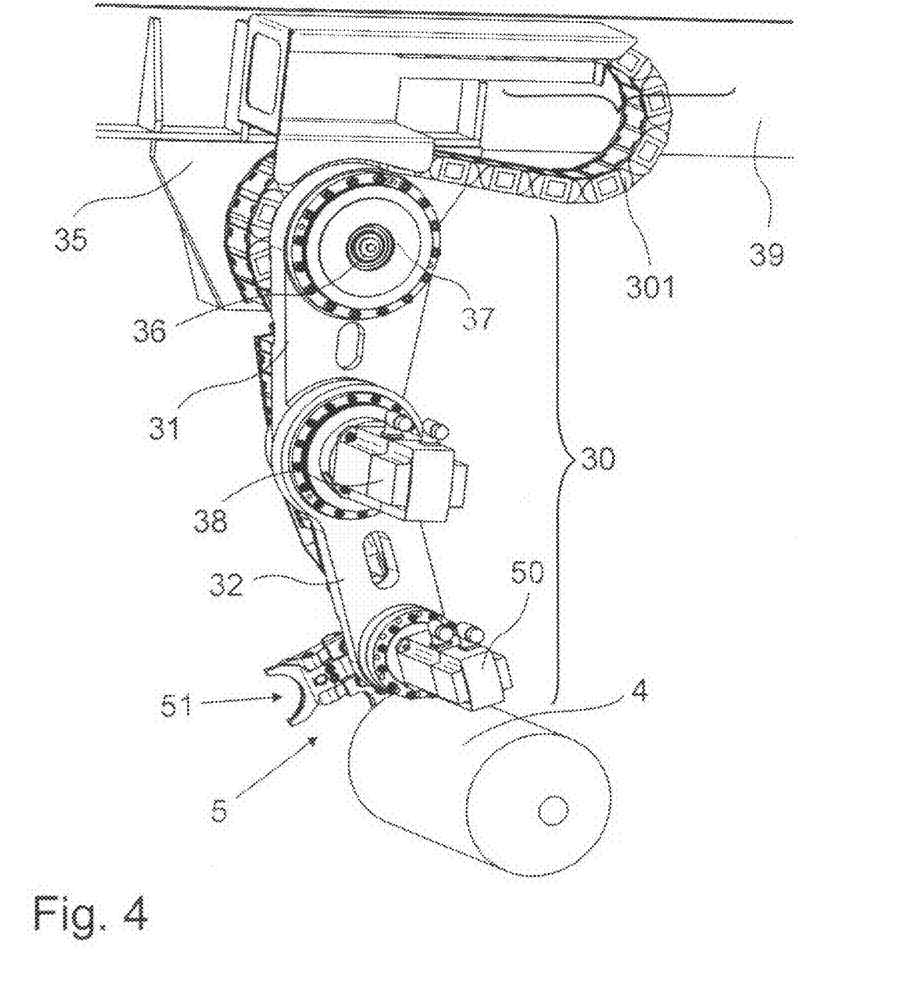
FIG. 4 in a three-dimensional view the tool change device according to the invention and FIG. 5 in a lateral sectional view the essential elements according to the machine tool of the invention during the tool change.

FIG. 4 shows in a detail enlargement one more time the tool change device 3 as it has already been described as an example by means of FIG. 2b and FIG. 2a, respectively.

The power transfer for the driving motors 38 and 50 as well as also the data transfer lines for the information transfer are arranged in the so-called energy chain 301 in order to allow a damage-free and reliable operation. The use of the energy chain 301 is here convenient in that respect as the lug may take a number of positions in the space, which the energy chain 301 can follow without any problems, because of the bending of its members 31, 32.

Figure 5:
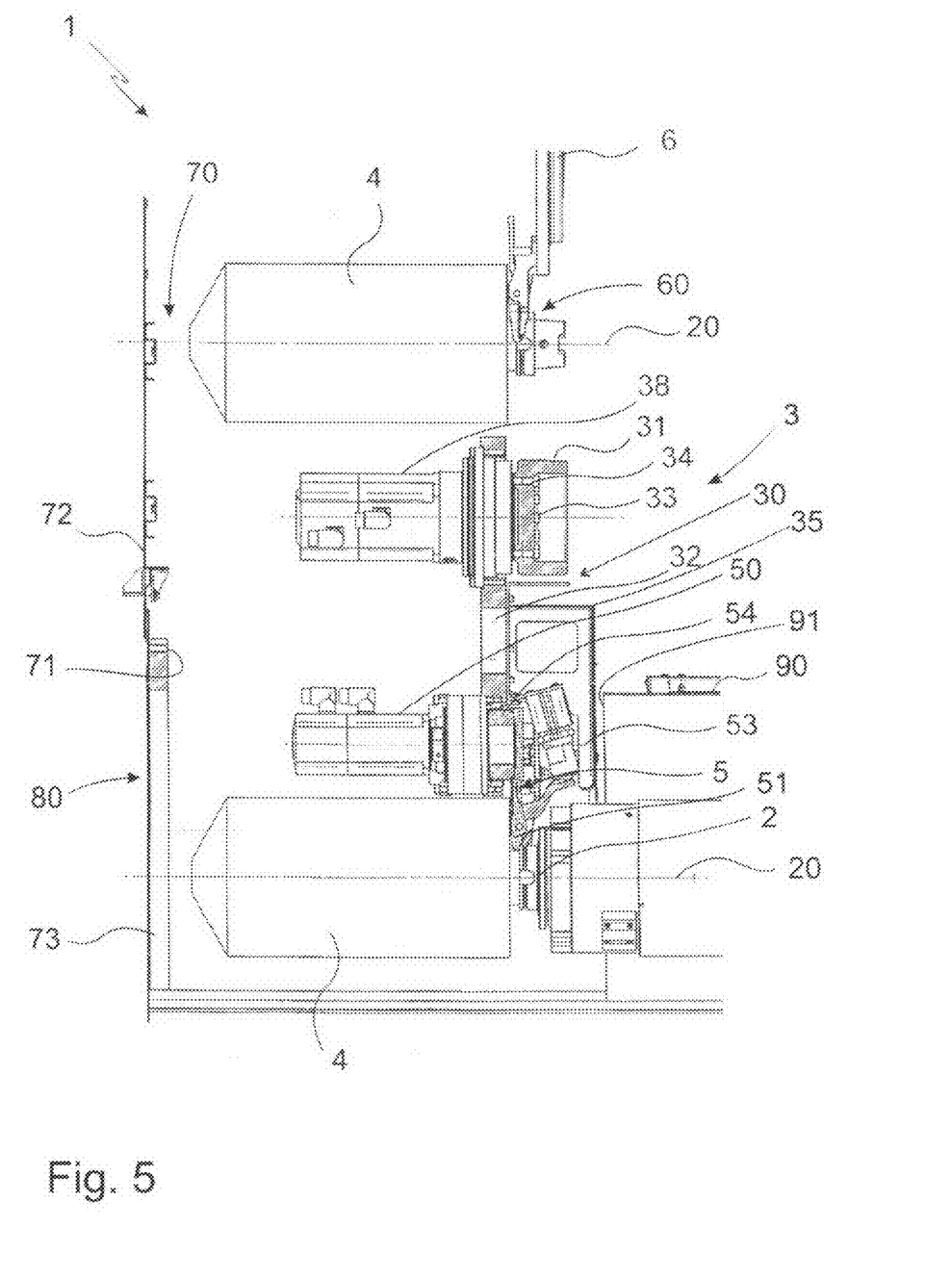

In FIG. 5 a section of the machine tool 1 according to the invention is shown schematically and in a lateral sectional view. The different elements of the machine tool 1 can discerned here partly, for example a part of the tool magazine 6 with storing place 60 provided at it for a machining tool 4 which has been brought in a position which can be reached by the tool change device 3. This has been realized by rotation of the tool magazine.

Below the machining tool 4 supplied in the tool magazine 6 the tool change device 3 can be seen partly. It has a lug 30 consisting of two members 31, 32 altogether. The tool change device 3 consists of a basic body 35 covered partly in FIG. 5, to which the lug 30 is flexibly connected via a basic joint 37 partly covered in FIG. 5. On the end of the lug 30 turned away from the basic body 35 there is the tool carrier 5. This is shown in FIG. 5 during the use of the machining tool 4 in the tool spindle 2.

The lug 30 consists in the embodiment of FIG. 5 of two members 31, 32 connected to each other by a bent joint 34. The tool carrier 5 is again connected via a carrier joint with the second member 32 of the lug 30. Arranged at the joints 34 there are the drives 38, 50 for the movement of the tool change device 3. They are arranged in the embodiment directly on the axes, that means the bent axis 33 of the lug 30 or the carrier axis 53 of the tool carrier 5, and designed as rotational drives 38, 50. The rotational drives 38, 50 thus make an optimal positioning of the tool carrier or the complete tool change device 5, seen always relatively to the tool spindle 2, possible. The rotational drives 38, 50 guarantee also a precise and fast positioning of the tool carrier 5. By means of that, on the one hand, a machining tool 4 can be taken out of the tool magazine 6, and, on the other hand, be put highly precisely in the tool spindle 2.

The tool spindle 2 can be moved and positioned along several axes 20. In FIG. 5, the only one of them shown is the spindle axis 20. For the machining process the tool spindle 2 or the machining tool 4 arranged on it can be inserted along the spindle axis 20 in a machining space 80. This machining space is linked in the example of FIG. 5 on the left side to the tool change space 70. In this tool change space 70 the actual exchange of the machining tools 4 takes place. For that the tool spindle 2 is drawn back along the spindle axis 20 relatively to the machining space 80, and brought in the tool change space 70. After that, the tool carrier 5 picks up the machining tool 4 arranged on the tool spindle 2, removes it and substitutes it by an also via the tool carrier 5 approached, other machining tool 4. Through the modification of the machine tool 1 indicated in FIG. 5 a spatial separation of tool change space 70 and machining space 80 is reached. The tool change device 3 is here in the tool change space 70, so that the design of the machining space 80 can be realized with a rather small volume. The machining space 80 only has to receive the machining tool 4 or the part of the tool spindle 2 carrying the machining tool 4 and the work piece to be machined (not shown). Thus a very compact construction of the machine tool 1 or the machining space 80 can be reached making a number of advantages possible, in particular during the cleaning of the work piece or the removal of chips and dust occurring during machining.

In machining condition the part of the tool spindle 2 or the machining tool 2 shown within the tool change space 70 in FIG. 5 is in the machining space 80. In order to be able to carry out a spatial sealing of the tool spindle 2 towards the tool change space 70 or the tool change device 3 positioned there, a cover 90 is provided which can be slipped in the tool change space 70, a encircles here the part of the tool spindle 2 which is in the tool change space 70 during machining. The cover 90 can be designed, for example, like a hood and can be moved simultaneously with the shifting of the tool spindle 2 along the spindle axis 20. A receiver 71 in which the front edge 91 of the cover 90 engages is provided in the dividing wall 72 separating the tool change space 70 from the machining space 80, in order to secure a sealing between the cover 90 and the dividing wall 72. This sealing prevents, for example, rinsing liquid, chips or dust from escaping from the machining space 80 in the tool change space 70. Thus during the machining a separation of the machining tool 4 and the machining space 80 towards the tool change space 70 and in particular of the tool change device 3 arranged within is reached altogether.

During machining the tool change device 3 or the tool carrier 5 arranged at it remains positioned in the tool change space 70. As position for the tool carrier 5 here the immediate vicinity to the tool spindle 2 or to the position where the machining tool 4 drawn in the tool change space 70 rests is chosen. By the immediate vicinity of tool carrier 5 and tool spindle 2 a tool change can be carried out fast. Because of the extremely precisely operating rotational drives 38, 50, for example step by step or continuously, which are provided at the lug 30 of the tool change device 3, and in connection with a corresponding control for the machine tool 1, the tool carrier 3 can carry out the movement of the tool spindle 2 which cannot move only in the direction of the spindle axis 20, but also parallel to the dividing wall 72. Thus an optimal positioning of the tool carrier 5 relatively to the tool spindle 2 can be carried out allowing a fast engagement of the tool carrier 3 at the tool spindle 2 during tool change.

In the dividing wall 72 a passage opening 73 is provided for the machining tool 4 or the tool spindle 2 carrying the machining tool 4 so that the machining tool 4 can be slipped in the machining space 80 without any problems. In order to secure a sealing of the machining space 80 towards the tool change space 70, the passage opening 73 is equipped with flexible passage elements (not shown) which allow movement of the tool spindle 2 or the machining tool 4 parallel to the dividing wall.

Although the invention has been described by exact examples which are illustrated in the most extensive detail, it is pointed out that this serves only for illustration, and that the invention is not necessarily limited to it because alternative embodiments and methods become clear for experts in view of the disclosure. Accordingly changes can be considered which can be made without departing from the contents of the described invention.

The invention claimed is:

1. A machine tool comprising a tool spindle, and at least one machining tool that can be changed or exchanged in the tool spindle by a tool change device provided in or on the machine tool, and the tool spindle sets the machining tool for machining purposes around a spindle axis in rotation, and the tool change device has a lug having at least two members, and the lug holds via a carrier joint linked on an exterior end of the lug a tool carrier receiving the machining tool, and the at least two members are connected movable relative to each other with respect to a bent joint with a bent joint axis, characterized in that the tool change device has rotational electric motors being position controlled or NC-controlled rotational electric motors on respective joints of the lug for movement of the at least two members or the tool carrier and wherein the at least two members form an angle between one another and a position of one of the at least two members relative to a basic body of the tool change device can be set or adjusted via the electric motors, and the tool carrier rotates around a carrier axis of the carrier joint, wherein a tool magazine with a number of storing places for the machining tools is provided and wherein the tool magazine is formed by at least two tool magazine parts arranged one beside the other or one behind the other with the tool magazine and the tool change device being arranged on a common carrier, with the tool change device having the basic body, the basic body being movable and positionable on or along a guide on the tool change device, the guide extending in a direction that is parallel to an axis extending through the tool magazine parts and wherein a machining space and a spatially apart tool change space are separated by a dividing wall, wherein the tool spindle can be shifted out of the machining space into the tool change space for tool changing and a cover wherein the cover is designed as a hood which encircles the tool spindle in the tool change space at least in sections, shifts parallely to the spindle axis such that the tool spindle is accessible for the tool change, and the cover is movable relative to the spindle axis.

2. The machine tool according to claim 1, characterized in that during use of the machining tool held by the tool spindle the tool carrier remains in the machine tool, and in the tool change space spatially separated from the machining space, and the tool change device or the tool carrier can he positioned during machining in the tool change space, and adjacent to the machining tool moved in the tool change space, wherein a constant distance remaining is provided between the machining tool and the tool change device or the tool carrier.

3. The machine tool according to claim 1, characterized in that the tool spindle is designed moving relatively to the spindle axis wherein the movement of the tool change device or the tool carrier can be set or adjusted by means of the movement of the tool spindle, or the tool change device or the tool spindle are arranged in a machine frame, or the tool change device is held by the machine frame.

4. The machine tool according to claim 1, characterized in that a swiveling movement of the at least two members or the tool carrier is provided.

5. The machine tool according to claim 1, characterized in that the lug is arranged on the basic body flexibly or rotating on a basic joint with a basic joint axis, and the basic body is designed stationary in the machine tool or is movable and can be positioned along the guide.

6. The machine tool according to claim 1, characterized in that the tool carrier has tool receivers which can he swiveled together around the carrier axis.

7. The machine tool according to claim 1, characterized in that, in a tool change position of the machine tool, a first tool receiver is at first empty for receiving the machining tool which has to be exchanged by the tool spindle, and a second tool receiver carries the machining tool which has to be changed into the tool spindle.

8. The machine tool according to claim 1, characterized in that the machine tool has a basic axis, the bent joint axis, a carrier axis and the spindle axis, and that an at least in pairs parallel arrangement of the basic axis, bent joint axis, carrier axis and spindle axis is provided.

9. The machine tool according to claim 1, wherein the tool magazine is designed as a disc magazine.

10. The machine tool according to claim 1, characterized in that the lug is arranged on the basic body flexibly or rotating on a basic joint with a basic joint axis, and the basic body can be positioned parallel to the spindle axis or rectangular to the spindle axis.

11. The machine tool according to claim 1, characterized by a drive control of the electric motors for carrying out rotations of the respective joints and movement of the at least two members.

12. The machine tool according to claim 1, characterized by a control of the tool change device integrated in a machine control of the machine tool.

13. The machine tool according to claim 12, wherein a tool change lock in which at least one holding place is provided for holding or locking the machining tool, and the lug moves the tool carrier to the holding place for processes which transfer tools inwards or outwards of the holding place.

14. The machine tool according to claim 1, wherein the dividing wall comprises an opening that can be closed by flexible elements.

15. The machine tool according to claim 1, wherein the dividing wall is provided for the tool change device to separate the machining space and the tool change space, and a stopper or a receiver for a sealed connection of the cover is provided on the dividing wall.

* * * * *